(12) United States Patent
Yau

(10) Patent No.: US 10,838,470 B1
(45) Date of Patent: Nov. 17, 2020

(54) MONITORING TEMPERATURE INSIDE COMPUTER CHASSIS

(71) Applicant: American Megatrends International, LLC, Norcross, GA (US)

(72) Inventor: Kai Yau, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 606 days.

(21) Appl. No.: 15/435,554

(22) Filed: Feb. 17, 2017

(51) Int. Cl.
```
G06F 1/20       (2006.01)
G01J 5/00       (2006.01)
G01J 5/02       (2006.01)
G05B 15/02      (2006.01)
H04N 5/33       (2006.01)
```

(52) U.S. Cl.
CPC ............ *G06F 1/206* (2013.01); *G01J 5/0096* (2013.01); *G01J 5/025* (2013.01); *G05B 15/02* (2013.01); *H04N 5/33* (2013.01)

(58) Field of Classification Search
CPC . G06F 1/20; G06F 1/203; G06F 1/206; G06F 11/0721; G06F 11/0754; G06F 11/0793; Y02D 10/16
See application file for complete search history.

(56) References Cited

U.S. PATENT DOCUMENTS

| | | | | |
|---|---|---|---|---|
| 6,038,633 A * | 3/2000 | Tavallaei | ............... | G06F 13/24 710/262 |
| 6,249,885 B1 * | 6/2001 | Johnson | ................... | G06F 1/20 714/47.2 |
| 7,316,606 B2 * | 1/2008 | Shipley | ..................... | G06F 1/20 312/236 |
| 7,360,945 B2 * | 4/2008 | Kardach | ................ | G06F 1/203 361/679.48 |
| 7,562,537 B2 * | 7/2009 | Liebenow | .............. | G01K 13/00 62/125 |
| 7,652,891 B2 * | 1/2010 | Lucero | ...................... | G06F 1/20 361/752 |
| 7,774,651 B2 * | 8/2010 | Mukherjee | .......... | G06F 11/0724 714/26 |
| 8,619,426 B2 * | 12/2013 | Chamseddine | ....... | F28D 7/0075 165/104.33 |
| 9,070,264 B2 | 6/2015 | Sivertsen | | |
| 9,541,971 B2 * | 1/2017 | Haridass | ................ | G06F 1/206 |
| 9,766,669 B2 * | 9/2017 | Atkinson | ............... | G06F 1/203 |
| 10,156,987 B1 * | 12/2018 | Gutierrez | ........... | G06F 11/3058 |

(Continued)

*Primary Examiner* — Crystal J Barnes-Bullock
(74) *Attorney, Agent, or Firm* — Newport IP, LLC; Leonard J. Hope

(57) ABSTRACT

A monitoring system may include a sensor configured to be mounted inside a computer chassis and generate sensor signals representative of a temperature associated with at least one computer component inside the computer chassis. The monitoring system may also include a sensor processor configured to receive the sensor signals and determine the temperature associated with the at least one computer component based at least in part on the sensor signals. The sensor processor may also be configured to compare the determined temperature with an expected temperature associated with the at least one computer component, and initiate a response when the determined temperature differs from the expected temperature by an amount equal to or greater than a threshold amount.

13 Claims, 7 Drawing Sheets

(56) References Cited

U.S. PATENT DOCUMENTS

| | | | | |
|---|---|---|---|---|
| 2006/0117779 A1* | 6/2006 | Liebenow | ............... | G01K 13/00 |
| | | | | 62/259.2 |
| 2006/0221568 A1* | 10/2006 | Kardach | ................ | G06F 1/203 |
| | | | | 361/679.46 |
| 2016/0363972 A1* | 12/2016 | McNally | ................ | G06F 1/206 |
| 2017/0168531 A1* | 6/2017 | Casparian | ............... | G06F 1/206 |

* cited by examiner

MONITORING TEMPERATURE INSIDE COMPUTER CHASSIS

BACKGROUND

As computer technology continues to rapidly advance, more powerful processors, greater memory capacities, and faster operating speeds are being developed. As such advances are made, the amount of heat that must be dissipated from operation of the computer components has increased. If the heat is not adequately dissipated, it may damage the computer components. For example, processors such as central processing units, chipsets, graphics cards, firmware, memory, disk drives, and other components may malfunction or sustain damage if they are allowed to operate at temperatures above acceptable levels. In addition, the temperature of a component during expected operation may be an indication of whether the component is operating, operating at its expected level of performance, or malfunctioning.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
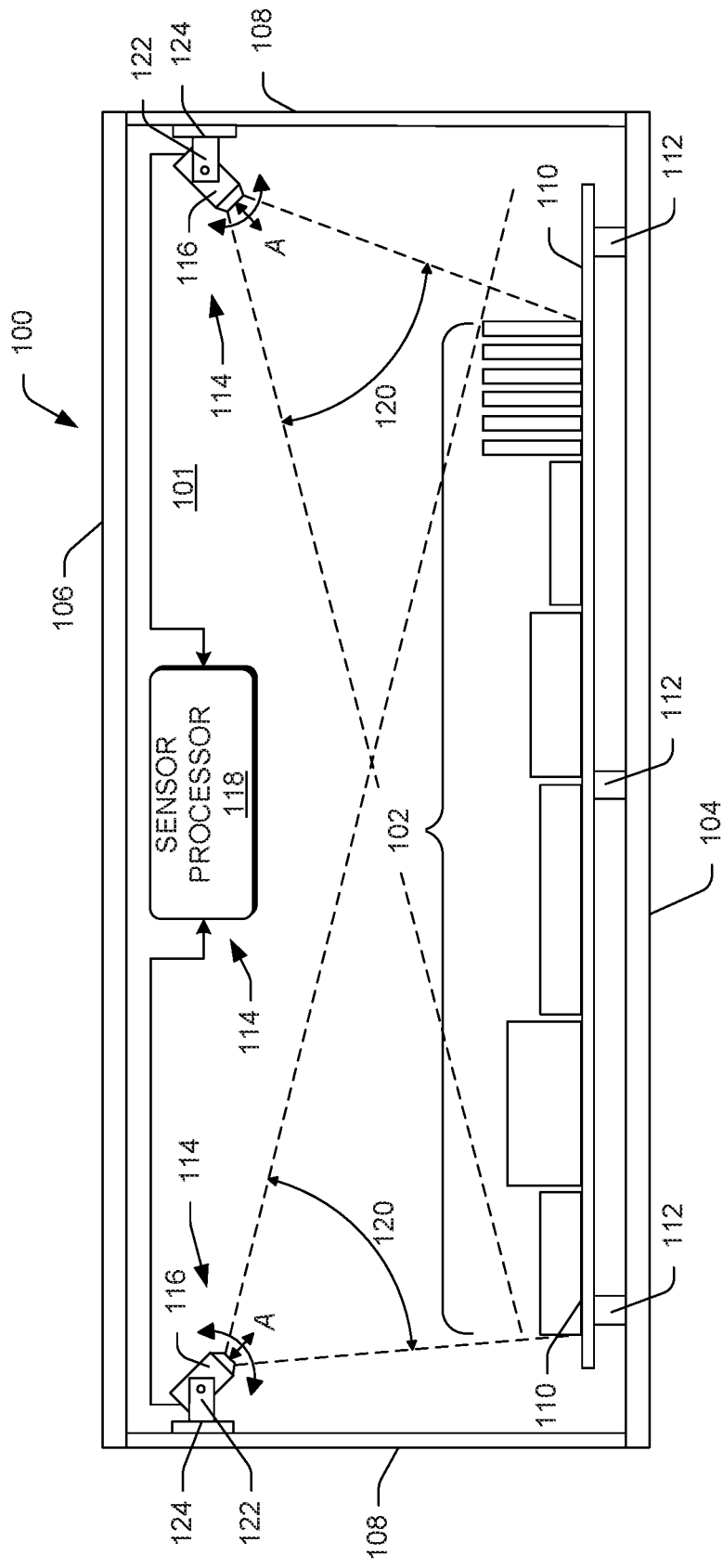
FIG. 1 is a schematic diagram providing a section view of a portion of an example monitoring system for monitoring temperature inside an example of a computer chassis.

During operation of a computer, heat is generated by many of the components of the computer, which are contained within the interior of a computer chassis. More powerful processors, greater memory capacities, and faster operating speeds may generally generate more heat during operation. If the heat generated by the components is not adequately controlled, the operation of the components may be impaired or the components may be damaged. For example, processors such as central processing units, chipsets, graphics cards, firmware, memory, disk drives, and other components may malfunction or sustain damage if they are allowed to operate at temperatures above certain levels. In addition, the temperature of a component during expected operation may be an indication of whether the component is operating, whether it is operating at its expected level of performance, or whether it is malfunctioning. As a result, it may be desirable to monitor the temperature inside a computer chassis during operation of the computer.

This disclosure is generally directed to a monitoring system for monitoring temperature inside a computer chassis defining an interior configured to contain a plurality of computer components. The monitoring system may include a sensor configured to be mounted inside the computer chassis and generate sensor signals representative of a temperature associated with at least one of the computer components. The monitoring system may also include a sensor processor configured to receive the sensor signals and determine the temperature associated with the at least one computer component based at least in part on the sensor signals. The sensor processor may also be configured to compare the determined temperature with an expected temperature associated with the at least one computer component, and initiate a response when the determined temperature differs from the expected temperature by an amount equal to or greater than a threshold amount. In some examples, initiating a response may include at least one of deactivating the at least one computer component, reducing the level of operation of the at least one computer component, at least one of activating or altering operation of a cooling system associated with the computer chassis, or sending signals indicative of the temperature difference to at least one of a user interface or a receiver located remotely from the computer chassis.

In some examples, the sensor may include one of an infrared sensor, a thermal camera, or an infrared camera. In some examples, the sensor may be configured to be aimed in a first direction to facilitate monitoring the temperature associated with the at least one computer component. In some examples, the sensor may be configured to be re-oriented to be aimed in a second direction different than the first direction. In some examples, the sensor may include a lens having an adjustable focus. In some examples, the monitoring system may include a bracket configured to mount the sensor inside the computer chassis such that the sensor is aimed in a first direction. In some examples, the bracket may be configured to facilitate re-orienting of the sensor inside the computer chassis, so that the sensor is aimed in a second direction different than the first direction.

In some examples, the interior of the computer chassis may define an area within which at least some of the plurality of computer components are present, and the sensor may be configured to be mounted in the computer chassis, such that the sensor signals are representative of the temperature associated with at least a majority of the area defined by the computer chassis. In some examples, the sensor processor may be configured to associate a virtual grid with the area defined by the computer chassis, such that the virtual grid defines virtual grid addresses associated with respective portions of the area corresponding to the virtual grid addresses. In some examples, the sensor processor may be configured to determine temperatures associated with the respective portions of the area and compare the determined temperatures of the respective portions of the area with respective expected temperatures associated with respective computer components that correspond to the virtual grid addresses. In some examples, the sensor processor may be configured to initiate a response when one or more of the determined temperatures differs from the respective expected temperatures by respective amounts equal to or greater than respective threshold amounts.

In some examples, the monitoring system may also include a user interface configured to facilitate selection of at least one of the virtual grid addresses corresponding to respective portions of the area for which the sensor processor will determine the temperature. For example, the monitoring system may be configured to compare the determined temperatures of the selected portions of the area with respective expected temperatures associated with respective computer components that correspond to the respective grid addresses. In some examples, the monitoring system may include a user interface configured to facilitate designation of the threshold amount, for example, for initiating a response when the determined temperature differs from the expected temperature by an amount equal to or greater than the threshold amount. In some examples, the expected temperature associated with the at least one computer component may include a temperature value determined based at least in part from prior operation of the at least one computer component.

This disclosure is also generally directed to a monitoring system for monitoring temperature inside a computer chassis defining an interior configured to contain a plurality of computer components. The system monitoring system may include a sensor configured to be mounted inside the computer chassis and generate sensor signals representative of a temperature associated with at least one of the computer components. The sensor may include one of an infrared sensor, a thermal camera, or an infrared camera. The monitoring system may also include a sensor processor configured to receive the sensor signals, determine the temperature associated with the at least one computer component based at least in part on the sensor signals, and compare the determined temperature with an expected temperature associated with the at least one computer component. The sensor processor may also be configured to send signals indicative of a temperature difference between the determined temperature and the expected temperature to at least one of a user interface or a receiver located remotely from the computer chassis.

In some examples, at least some of the plurality of computer components may be associated with a motherboard, and the sensor may be configured to be mounted in the computer chassis, such that the sensor signals are representative of the temperature associated with at least a portion of the motherboard. For example, the motherboard may define an area corresponding to a side of the motherboard with which the some of the plurality of computer components are associated, and the sensor may be configured to be mounted in the computer chassis, such that the sensor signals are representative of the temperature associated with at least a majority of the area defined by the motherboard. In some examples, the at least one computer component may include at least one of a processor, a central processing unit, a chipset, memory, memory chips containing firmware, a clock generator, an expansion card, a graphics card, a super input/output chip, or a disc drive.

In some examples, the sensor processor may be configured to associate a virtual grid with the area defined by the motherboard, such that the virtual grid defines virtual grid addresses associated with respective portions of the motherboard corresponding to the virtual grid addresses. In some examples, the sensor processor may be configured to determine temperatures associated with the respective portions of the motherboard, and compare the determined temperatures of the respective portions of the motherboard with respective expected temperatures associated with respective computer components that correspond to the virtual grid addresses. In some examples, the sensor processor may be configured to initiate a response when one or more of the determined temperatures differs from the respective expected temperatures by respective amounts equal to or greater than respective threshold amounts.

This disclosure is also generally directed to a method for monitoring temperature inside a computer chassis defining an interior. The method may include receiving at a sensor processor sensor signals representative of a temperature associated with at least one computer component of a plurality of computer components inside the computer chassis, and determining via the sensor processor a temperature associated with the at least one computer component based at least in part on the sensor signals. The method may also include comparing the determined temperature with an expected temperature associated with the at least one computer component, and initiating a response when the determined temperature differs from the expected temperature by an amount equal to or greater than a threshold amount.

In some examples of the method, initiating a response may include at least one of deactivating the at least one computer component, reducing the level of operation of the at least one computer component, at least one of activating or altering operation of a cooling system associated with the computer chassis, or sending signals indicative of the temperature difference to at least one of a user interface or a receiver located remotely from the computer chassis. For example, initiating a response may include sending signals indicative of the temperature difference to at least one of a user interface or a receiver located remotely from the computer chassis, and the method may further include comparing the determined temperature with a determined temperature associated with a temperature inside at least one other computer chassis. In such examples, if the determined temperature is different than the determined temperature associated with the temperature inside the at least one other computer chassis, it may indicate that the room, or portion of a room, in which one computer is located may be at a different temperature than a room, or portion of the room, in which the at least one other computer is located, are at different temperatures. This may indicate a problem associated with the temperature regulation within one of the rooms or the portion thereof.

In some examples of the method, the interior of the computer chassis may define an area within which at least some of the plurality of computer components are present, and the method may include determining a temperature associated with at least a majority of the area defined by the computer chassis. Some examples of the method may include associating a virtual grid with the area defined by the computer chassis, such that the virtual grid defines virtual grid addresses associated with respective portions of the area corresponding to the virtual grid addresses. Determining the temperature may include determining temperatures associated with the respective portions of the area, wherein comparing the determined temperatures may include comparing the determined temperatures of the respective portions of the area with respective expected temperatures associated with respective computer components that correspond to the virtual grid addresses. In some examples, initiating a response may include initiating a response when one or more of the determined temperatures differs from the respective expected temperatures by respective amounts equal to or greater than respective threshold amounts. Some examples of the method may include selecting via a user interface at least one of the virtual grid addresses corresponding to respective portions of the area for which the sensor processor will determine the temperature. The method may further include comparing the determined temperatures of the selected portions of the area with respective expected temperatures associated with respective computer components that correspond to the respective grid addresses.

In some examples of the method, at least some of the plurality of computer components may be associated with a motherboard, and receiving the sensor signals may include receiving sensor signals representative of a temperature associated with at least a portion of the motherboard. The motherboard may define an area corresponding to a side of the motherboard with which the at least some computer components are associated, and receiving the sensor signals may include receiving sensor signals representative of a temperature associated with at least a majority of the area defined by the motherboard. Some examples of the method may include associating a virtual grid with the area defined by the motherboard, such that the virtual grid defines virtual grid addresses associated with respective portions of the motherboard corresponding to the virtual grid addresses, and determining the temperature may include determining temperatures associated with the respective portions of the motherboard. In some examples of the method, comparing the determined temperatures may include comparing the determined temperatures of the respective portions of the motherboard with respective expected temperatures associated with respective computer components that correspond to the virtual grid addresses. In such examples, initiating a response may include initiating a response when one or more of the determined temperatures differs from the respective expected temperatures by respective amounts equal to or greater than respective threshold amounts. Initiating a response may include at least one of deactivating the at least one computer component, reducing the level of operation of the at least one computer component, at least one of activating or altering operation of a cooling system associated with the computer chassis, or sending signals indicative of the temperature difference to at least one of a user interface or a receiver located remotely from the computer chassis.

The techniques and systems described herein may be implemented in a number of ways. Example implementations are provided below with reference to the following figures.

FIG. 1 is a schematic section view of an example computer chassis 100 defining an interior 101 configured to contain a plurality of computer components 102. For example, the computer chassis 100 may be a part of any type of computer, such as, for example, a server or a personal computer. Other types of computers are contemplated. In the example shown, the computer chassis 100 includes a bottom 104 and a top 106 coupled to one another by side walls 108, at least one of which may be opened or removed to gain access to the computer components 102 inside the computer chassis 100.

As shown in FIG. 1, at least some of the computer components 102 may be coupled to a motherboard 110, which in turn, may be coupled to the bottom 104 of the computer chassis 100, for example, via bosses 112 and fasteners, such as, for example, screws, bolts or other fasteners. In the example shown, the computer chassis 100 is configured to lie on its bottom 104 with its bottom 104 being horizontal. Other configurations of computer chassis are contemplated, such as, for example, computer chassis that are intended to stand upright (i.e., where one of the side walls 108 would be on the bottom). In such examples, the computer components 102 and/or the motherboard 110 may be coupled to any one or more of the bottom 104, top 106, or side walls 108. Other orientations and configurations are contemplated. The computer components may include one or more of a processor, a central processing unit, a chipset, memory, memory chips containing firmware, a clock generator, an expansion card, a graphics card, a super input/output chip, a disc drive, or any other computer component suitable for being enclosed in the computer chassis 100.

FIG. 1 also shows an example of a monitoring system 114 for monitoring temperature inside the computer chassis 100. As schematically depicted in FIG. 1, the example monitoring system 114 includes one or more sensors 116 mounted inside the computer chassis 100 and configured to generate sensor signals representative of a temperature associated with at least one of the computer components 102. For example, as shown in FIG. 1, the example monitoring system 114 includes two sensors 116 coupled to opposing side walls 108 of the computer chassis 100. In some examples, the monitoring system 114 may include more sensors 116, and the sensors 116 may be mounted inside the computer chassis 100 in different locations and/or at different orientations. The example monitoring system 114 shown schematically in FIG. 1 also includes a sensor processor 118 configured to receive the sensor signals from the one or more sensors 116, and determine the temperature associated with the at least one of the computer components 102 based at least in part on the sensor signals. In some examples, the sensor processor 118 may also be configured to compare the determined temperature with an expected temperature associated with the at least one computer component, and initiate a response when the determined temperature differs from the expected temperature by an amount equal to or greater than a threshold amount, for example, as discussed further herein. Although the sensor processor 118 shown in FIG. 1 is schematically depicted as being separate from the other computer components 102, it is contemplated that the sensor processor 118 may be incorporated into one or more of the computer components 102, for example, such that one or more of the functions of the sensor processor may be performed by one or more of the computer components 102.

In some examples, the one or more sensors 116 may include an infrared sensor, a thermal camera, an infrared camera, and/or any other suitable sensor type configured to generate sensor signals representative of temperatures associated with one or more of the computer components 102 inside the computer chassis 100. For example, the sensors 116 may be infrared cameras configured to be in communication with the sensor processor 118 via an electrical connection, such as, for example, a USB connection. In some examples, the sensors 116 may be in communication with the sensor processor 118 via a wireless connection, such as a Bluetooth connection or a Wi-Fi connection.

In the example shown in FIG. 1, the example sensors 116 are configured to be aimed in a direction to facilitate monitoring the temperature associated with at least one of the computer components 102. For example, the sensors 116 may be aimed in a first direction A such that a field of view 120 covers an area defined by the layout of the computer components 102 to facilitate monitoring the temperature associated with at least one of the computer components.

In some examples, one or more of the sensors 116 may be configured to be re-oriented to be aimed in a second direction that is different than the first direction A. for example, such that the field of view 120 covers a different area. This may facilitate monitoring of the temperature of computer components 102 associated with a different area defined by the layout of the computer components 102. For example, as shown in FIG. 1, one or more of the sensors 116 may be coupled to a bracket 122 configured to mount the sensor 116 inside the computer chassis 100, such that the sensor 116 is aimed in the first direction A, and wherein the bracket 122 may be configured to facilitate re-orienting of the sensor 116 inside the computer chassis 100, so that the sensor 116 is aimed in a second direction different that is than the first direction. In some examples, the sensor 116 may be re-oriented with respect to more than a single plane, such as for, example, with respect to two or three planes. In some examples, the one or more of the sensors 116 may include a lens having an adjustable focus, for example, which may improve the accuracy of the sensor signals associated with a particular computer component (or group of computer components) of interest. For example, if the temperature associated with memory chips including firmware is of particular interest, one or more of the sensors 116 may be oriented and/or focused on a portion of the interior of the computer chassis 100 that corresponds to the location of the memory chips including the firmware. In some examples, the monitoring system 114 may include one more respective adjustors 124 associated with the one or more of the sensors 116 and configured to re-orient and/or focus the sensors 116. For example, the adjustors 124 may include one or more actuators such as linear actuators and/or motors coupled to the sensors 116 and configured to re-orient and/or focus the sensors 116. In some examples, the sensors 116 may be re-oriented and/or focused manually.

Figure 2:
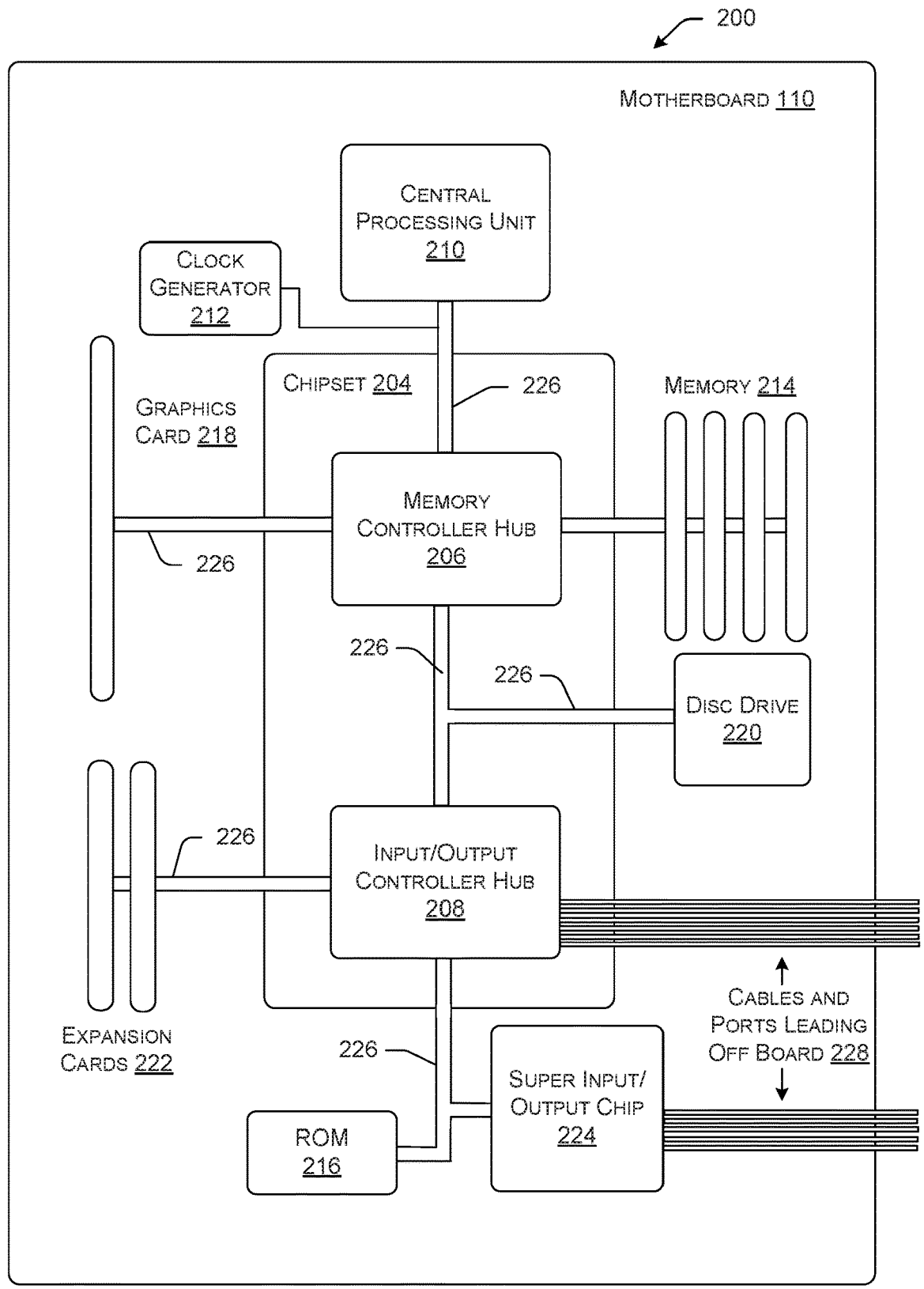
FIG. 2 is a schematic diagram of an example of a motherboard.

FIG. 2 schematically depicts an example area 200 within an example interior 101 of a computer chassis 102. In the example shown, the interior 101 of the computer chassis 100 defines an area 200 within which at least some of the plurality of computer components 102 are present. As shown in FIG. 1, the one or more sensors 116 may be mounted in the computer chassis 102 and configured such that the sensor signals are representative of the temperature associated with at least a majority of the area 200 defined by the computer chassis 102.

For example, the example computer components shown in FIG. 2 include an example motherboard 110 defining an area corresponding to the area 200 and a side of the motherboard 110 with which the some of the plurality of computer components 102 are associated. For example, the computer components may include a chipset 204, which may include a memory controller hub 206 and an input/output controller hub 208. The computer components 102 may also include processors, such as, for example, a central processing unit (CPU) 210, a clock generator 212, memory 214, for example, in the form of memory cards and read only (ROM) memory 216 including firmware such as BIOS, one or more graphics cards 218, one or more disc drives 220, one or more expansion cards 222, and a super input/output chip 224. One or more of the computer components 102 may be in communication with one another via a bus 226, and cables and ports 228 may be provided to various input and output devices, such as keyboards, mice, displays, printers, network connections, and other computers. The example computer components 102 and arrangements shown in FIG. 2 are merely an example, and other computer components and arrangements are contemplated.

In some examples, the sensor processor 118 may be configured to associate a virtual grid with the area 200 defined by the computer chassis 100, such that the virtual grid defines virtual grid addresses associated with respective portions of the area 200 corresponding to the virtual grid addresses. For example, FIGS. 3 and 4 schematically depict an example virtual grid 300 defining virtual grid addresses 302, which may be associated with respective portions of the area 200 corresponding to the virtual grid addresses 302.

Figure 3:
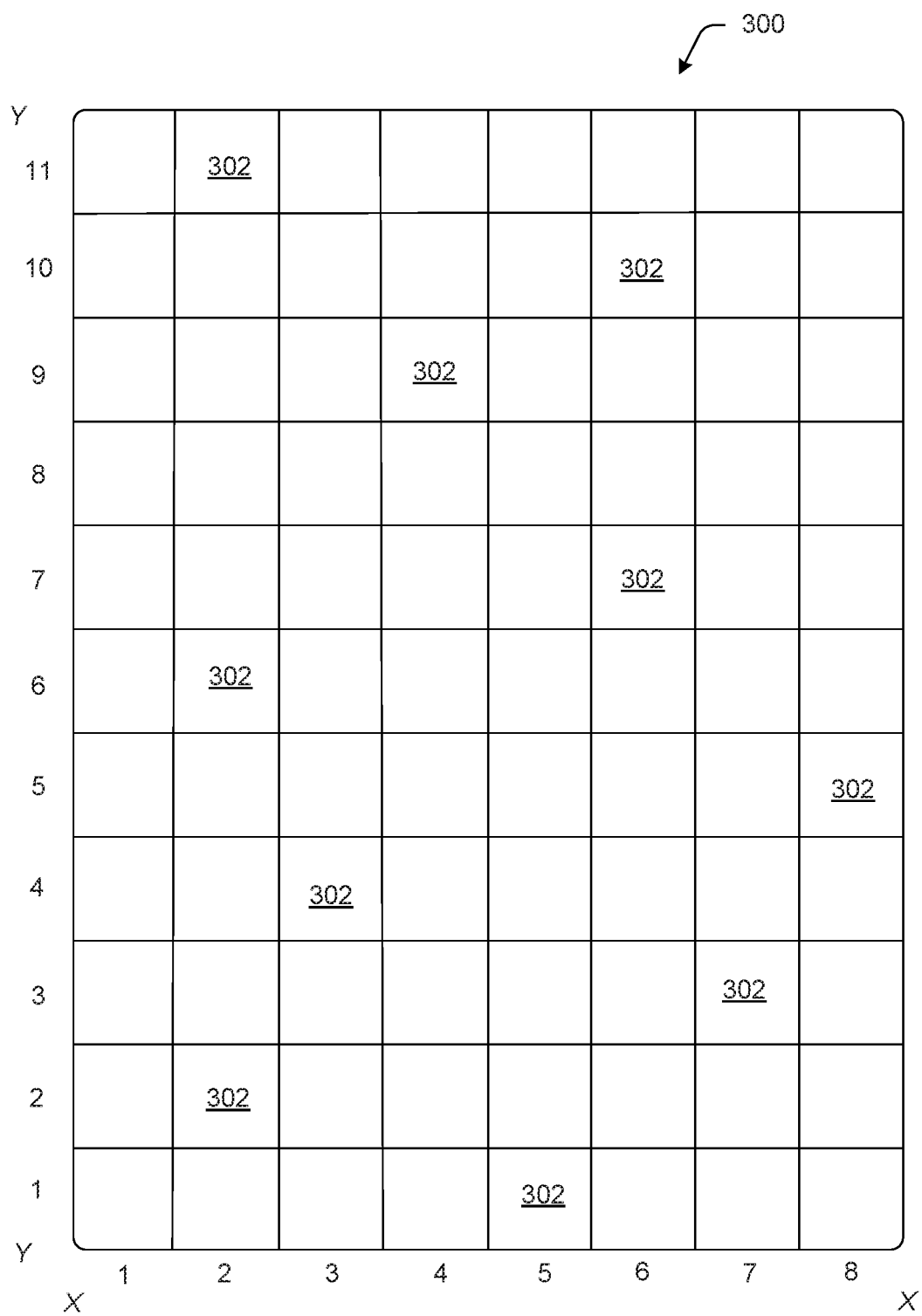
FIG. 3 is a schematic diagram of an example virtual grid.
Figure 4:
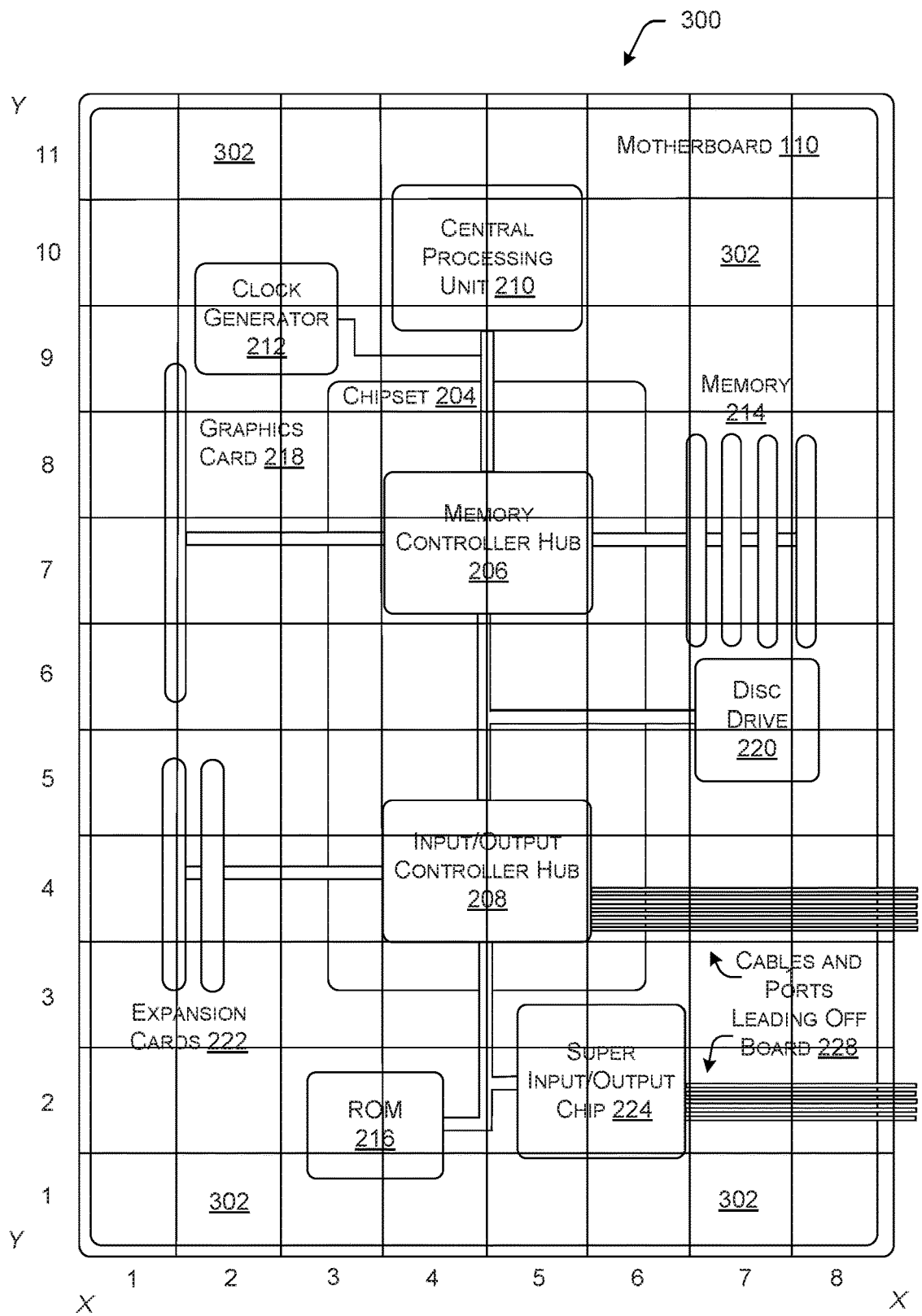
FIG. 4 is a schematic diagram of the example motherboard shown in FIG. 2 with the example virtual grid shown in FIG. 3 overlaid on the example motherboard.

For example, as shown in FIG. 3, the example virtual grid 300 includes a two-dimensional matrix including a first axis X and a second axis Y that may be used to identify the virtual grid addresses 302, for example, via an X-axis coordinate and a Y-axis coordinate. FIG. 4 shows a schematic diagram of the example motherboard 110 shown in FIG. 2 with the example virtual grid 300 shown in FIG. 3 overlaid on the example motherboard 110. As shown in FIG. 4, the virtual grid 300 defines virtual grid addresses 302, which are associated with respective portions of the area 200 corresponding to the virtual grid addresses 302.

For example, the ROM 216 associated with the motherboard 110 corresponds to the virtual grid address 302 corresponding to the X-axis coordinates 3 and 4 and the Y-axis coordinates 1 and 2. As another example, the central processing unit 210 associated with the motherboard 110 corresponds to the virtual grid address 302 corresponding to the X-axis coordinates 4 and 5 and the Y-axis coordinates 9-11. In this example manner, the monitoring system 114 may be configured to associate the virtual grid 300 with the area 200 defined by the computer chassis 100, such that the virtual grid 300 defines virtual grid addresses 302 associated with respective portions of the area 200 corresponding to the virtual grid addresses 302.

In some examples of the monitoring system 114, the sensor processor 118 may be configured to determine temperatures associated with the respective portions of the area 200, and compare the determined temperatures of the respective portions of the area 200 with respective expected temperatures associated with respective computer components 102 that correspond to the virtual grid addresses 302. The monitoring system 114 may be configured to initiate a response when one or more of the determined temperatures differs from the respective expected temperatures by respective amounts equal to or greater than respective threshold amounts.

Figure 5:
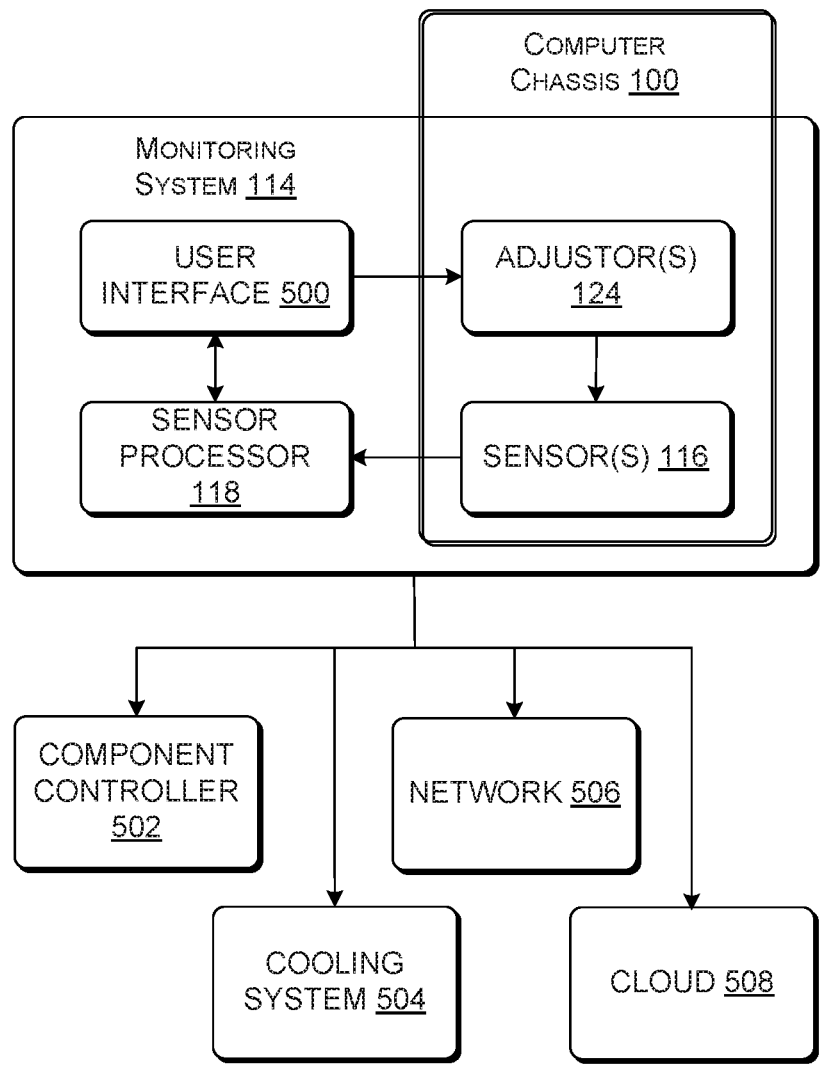
FIG. 5 is a schematic diagram of an example monitoring system.

As shown in FIG. 5, some examples of the monitoring system 114 may include a user interface 500 configured to permit selection of at least one of the virtual grid addresses 302 corresponding to respective portions of the area 200 for which the sensor processor 118 will determine the temperature. In such examples, the sensor processor 118 may be configured to compare the determined temperatures of the selected portions of the area 200 with respective expected temperatures associated with respective computer components that correspond to the respective grid addresses 302.

For example, the user interface 500 may include a display showing the virtual grid 300, which provides a person (e.g., a computer administrator) with the ability to select one or more portions of the area 200 associated with the computer components 102 for monitoring via the monitoring system 114. For example, a person may be able to use a cursor or other controllable selection device to select one or more portions of the area 200 corresponding to one or more virtual grid addresses 302 of the virtual grid 300. For example, as shown in FIG. 4, the virtual grid addresses corresponding to the X-axis coordinates 1 and 2, and the Y-axis coordinates 6 through 9 for monitoring the graphics card 218. In this example manner, a person may select various portions of the area 200 for monitoring by the monitoring system 114.

In some examples, the user interface 500 may be used to monitor the output of the monitoring system 114. For example, the user interface 500 may include a display showing images representative of the sensor signals received from the sensors 116 and the sensor processor 118. In some examples, the user interface 500 may be configured to display a color-coded scale representation of the temperatures associated with the various portions of the area 200 associated with the computer components 102. The colors of the color-coded scale correspond to different temperatures detected by the sensors 116. For example, the color-coded scale representation may include an image representation of the area 200 of the computer components 102, with the colors of the image ranging from dark purple to yellow-white, with the dark purple color corresponding to the coolest temperatures of the image, and the yellow-white color corresponding to the hottest part of the image. Thus, if a particular computer component is at a higher temperature than the other computer components, the image displayed will be closer to the yellow-white color of the scale than the other components, which would be closer to the dark purple color of the scale. In some examples, the color-coded images may be supplemented (or replaced) with textual and/or graphic information representative of temperature readings on the virtual grid 300.

Figure 6:
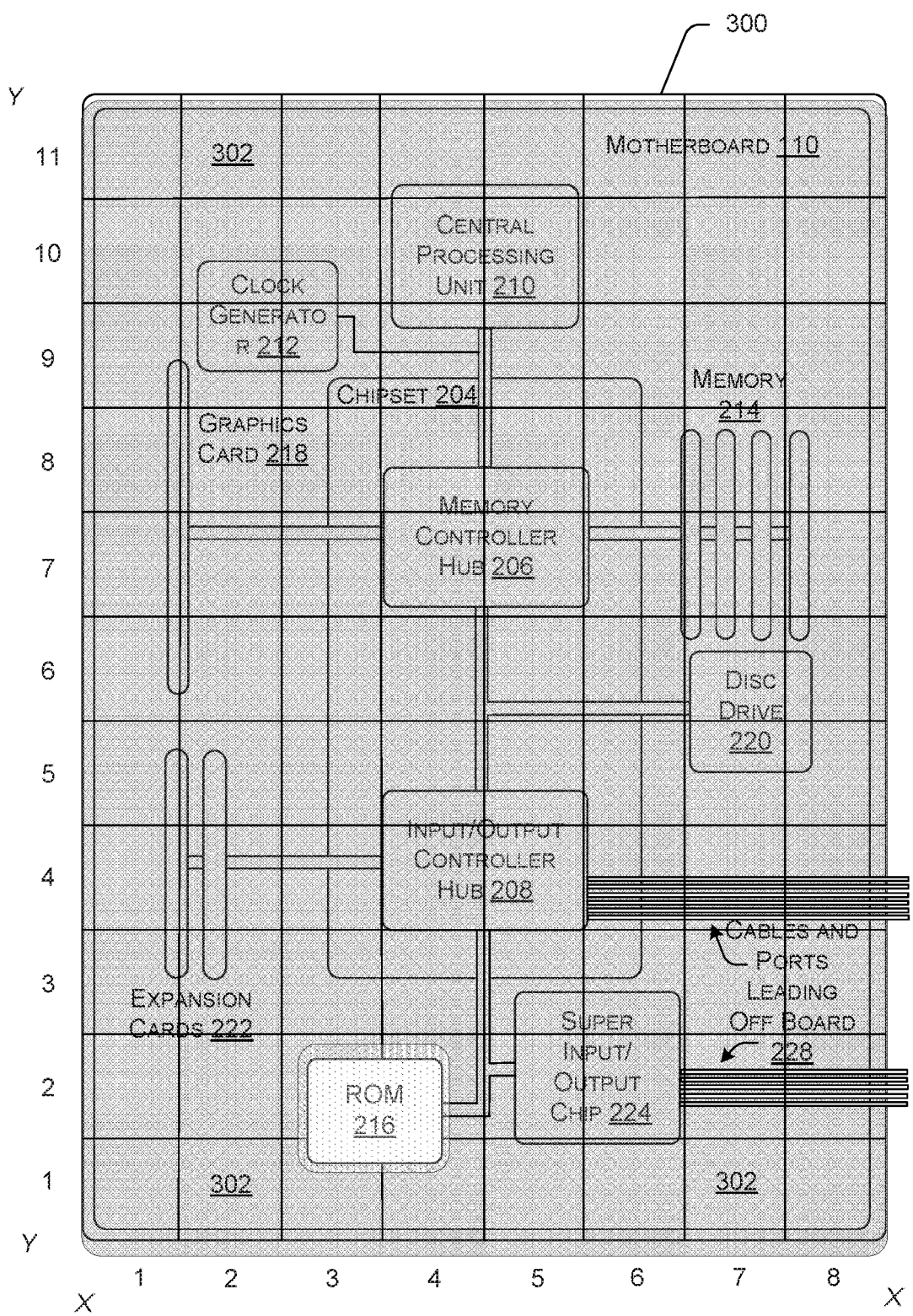
FIG. 6 is a schematic diagram of an example color-coded scale representation of the temperatures associated with the various portions of an area associated with the example virtual grid and computer components shown in FIG. 4.

For example, FIG. 6 shows a schematic representation of a color-coded scale representation 600 of the temperatures associated with the various portions of the area 200 associated with the computer components 102, with the virtual grid 300 overlying the area 200. In FIG. 6, the darker shaded area (e.g., representing dark purple) of the representation 600 depicts relatively cooler temperatures, and the lighter shaded area (e.g., representing yellow-white) of the representation 600 depicts relatively hotter temperatures. As shown in FIG. 6, the lighter shaded area 602 corresponds to the ROM 216, indicating that the ROM 216 is at a higher temperature than the remainder of the area 200. Depending on the temperatures associated with the different colors of the color-coded scale, this may indicate that the ROM 216 is at a higher temperature than expected (and/or desired). In such cases, the monitoring system 114 may be configured to initiate a response, such as, for example, reducing the level of operation of the ROM 216, deactivating the ROM 216, and/or activating or altering operation of a cooling system associated with the computer chassis 100, or sending signals indicative of the temperature difference to at least one of a user interface or a receiver located remotely from the computer chassis 100.

In some examples of the monitoring system 114, the user interface 500 may also be used to re-orient and/or focus one or more of the sensors 116. For example, as shown in FIG. 5, the monitoring system 114 may include one more respective adjustors 124 associated with one or more of the sensors 116 and configured to re-orient and/or focus the sensors 116. For example, the adjustors 124 may include one or more actuators such as linear actuators and/or motors coupled to the sensors 116 and configured to re-orient and/or focus the sensors 116. The user interface 500 may be in communication with the adjustors 124 and may be configured to control the re-orientation and/or focusing of the sensors 116 via, for example, the adjustors 124.

For example, as shown in FIG. 5, some examples of the monitoring system 114 may be in communication with one or more of a component controller 502, a cooling system 504, a network 506, and the cloud 508. For example, the monitoring system 114 may be in communication via one or more of a wireless link and a physical link with the component controller 502, the cooling system 504, a network 506, and the cloud 508.

In some examples, the component controller 502 may be configured to communicate with different components of the computer and provide command signals for either reducing the level of operation of the components or ceasing operation of the components. For example, if the monitoring system 114 determines that the temperature associated with the component is higher than expected, or higher than a threshold above which damage to the component may occur with continued operation of the component at its current level of operation, the component controller 502 may provide command signals to the computer to either reduce the level of operation of the component (e.g., by soft cooling and/or undervolting) or cease operation of the component, for example, until the temperature has returned to an acceptable level. The component controller 502 may be integrated into the monitoring system 114, or it may be part of the computer, for example, in the form of instructions stored in memory and executable by one or more processors. This may serve to prevent damage to the computer components.

In some examples, the monitoring system 114 may be in communication with a cooling system 504 configured to cool one or more of the computer components 102. For example, the cooling system 504 may include one or more of any suitable known types of computer cooling systems, such as, for example, cooling fans, piezoelectric pumps, liquid cooling, liquid submersion cooling systems, waste heat reduction systems, and/or Peltier cooling systems. The monitoring system 114 may be configured to initiate activation of the cooling system 504 if the temperature associated with one or more of the computer components is higher than expected, or for example, the temperature is above the expected temperature by an amount greater than or equal to a threshold amount.

As shown in FIG. 5, some examples of the monitoring system 114 may be in communication with a network 506 and/or the cloud 508, for example, via a wireless and/or physical communication link. This may facilitate analysis of temperature data received from the monitoring system 114. For example, from the temperature data, it may be determined whether one or more of the computer components is operating properly. For example, if the temperature data associated with one of the computer components is too low, for example, the temperature is below the expected temperature by an amount greater than or equal to a threshold amount, it may be an indication that (1) the component is not present in the expected location in the computer chassis 100, (2) the component is not operating, (3) the component is operating below expected performance levels, (4) the component is malfunctioning, or (5) the component is damaged. For example, the monitoring system 114 may be used to determine whether certain components are present in the computer chassis 100. For example, if the sensors 116 generate signals indicating that the temperature associated with the component is lower than the expected temperature (e.g., by more than the threshold amount), it may be an indication that the component is not in the computer chassis 100. Alternatively, if the temperature data associated with one of the computer components is too high, for example, the temperature is above the expected temperature by an amount greater than or equal to a threshold amount, it may be an indication that (1) the component is malfunctioning, (2) the component is operating at a level higher than its expected (or intended) performance level, or (3) the component is damaged. In some examples, this analysis may be performed by the monitoring system 114, or the monitoring system 114 may assist with performance of this analysis when performed by one more components of the computer.

In some examples, the temperature data from different computers may be compared, and differences may be investigated to determine causes for the differences and/or corrective action for reducing or eliminating the differences. For example, the monitoring system 114 may communicate via a network 506 and/or the cloud 508 to provide the temperature data to a remote location or remote systems that receive similar data from other computers. The temperature data from the different computers may be compared, and an analysis of the comparison may be used to determine whether corrective action is advisable. For example, the temperature data associated with the components of a computer may provide an indication of the level of performance of the computer, with lower temperatures being generally associated with lower levels of performance and higher temperatures being generally associated with higher levels of performance, unless the temperatures are too high, which may be an indication of a malfunction or overload. In addition, if the computers associated with a particular location have higher temperatures than computers associated with another location, it may be an indication of differences in the respective ambient temperatures associated with the locations. For example, if the temperature data received from computers in a first room shows higher temperatures associated with the respective computers than temperature data from another room, it may be an indication that the cooling of the first room is inadequate for the computers. Similarly, if the temperature data received from computers on a first side of a room shows higher temperatures associated with the respective computers than temperature data from the other side of the room, it may be an indication the cooling of the room is inadequate for the computers on the first side of the room.

In various implementations, the monitoring system 114 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor(s) may commonly, but not necessarily, implement the same ISA.

The monitoring system 114 may include a non-transitory computer readable media that may be configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent or stored upon different types of computer-accessible media, such as non-transitory media, or on similar media separate from the non-transitory computer readable media or the monitoring system 114. Generally speaking, a non-transitory, computer readable memory may include storage media or memory media such as flash memory (e.g., solid state memory), magnetic or optical media (e.g., disk) coupled to the monitoring system 114 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some examples, an I/O interface may be configured to coordinate I/O traffic between the processor(s), the non-transitory computer readable media, and any peripheral devices, the network interface or other peripheral interfaces, such as input/output devices. In some implementations, the I/O interface may perform any necessary protocol, timing or other data transformations to convert data signals from one component (e.g., non-transitory computer readable media) into a format suitable for use by another component (e.g., processor(s)). In some implementations, the I/O interface may include support for devices attached through various types of peripheral buses, such as, for example, a variant of the Peripheral Component Interconnect (PCI) bus standard or the Universal Serial Bus (USB) standard. In some implementations, the function of the I/O interface may be split into two or more separate components, such as, for example, a north bridge and a south bridge. Also, in some implementations, some or all of the functionality of the I/O interface, such as an interface to the non-transitory computer readable media may be incorporated directly into the processor(s).

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the monitoring system 114 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The monitoring system 114 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated monitoring system 114. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the monitoring system 114 may be transmitted to the monitoring system 114 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other system configurations.

Figure 7:
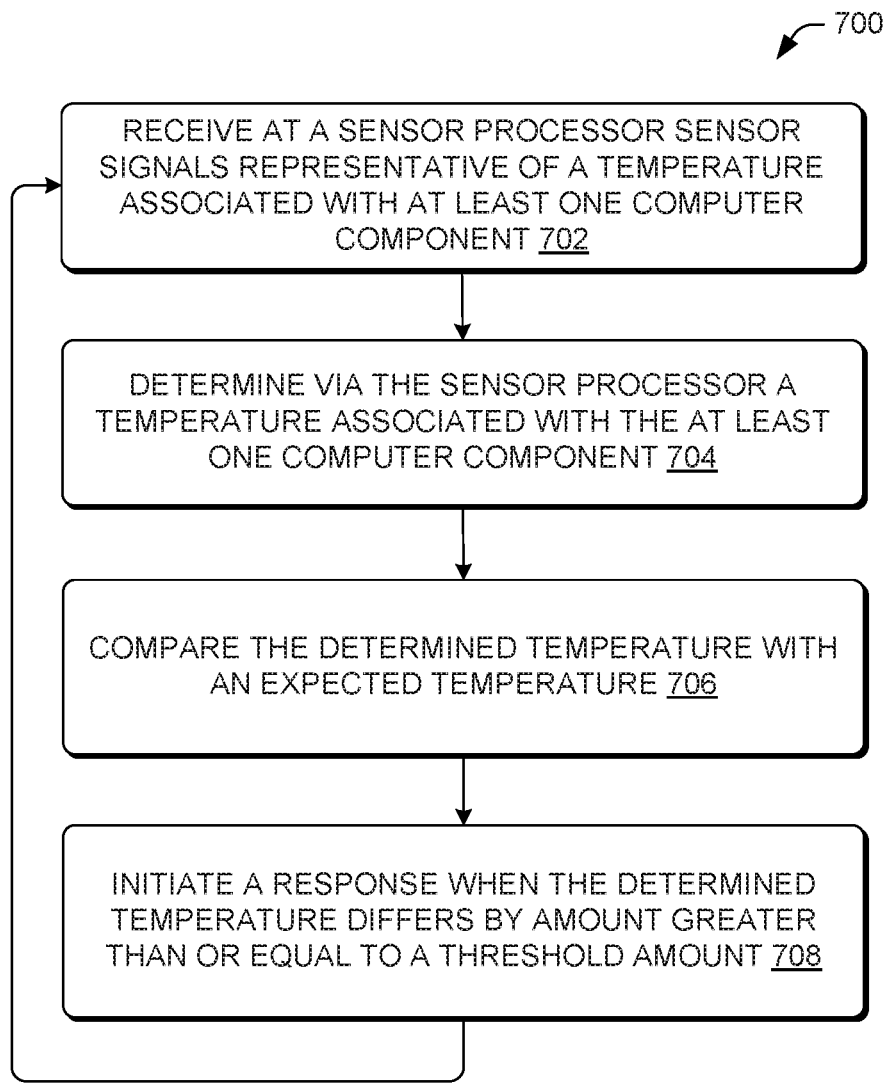
FIG. 7 is a flow diagram of an example process for monitoring temperature inside a computer chassis.

FIG. 7 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an example process 700 for monitoring temperature inside a computer chassis. The process 700 may be implemented for a computer chassis 100 such as those described herein and the monitoring system 114 described herein, or in other computer chassis and using other systems.

The illustrative process 700, at 702, may include receiving at a sensor processor sensor signals representative of a temperature associated with at least one computer component of a plurality of computer components inside the computer chassis. For example, one or more sensors may be configured to generate sensor signals representative of a temperature associated with at least one computer component of a plurality of computer components inside the computer chassis. The one or more sensors may be in communication, for example, via a wireless and/or physical communication link, with the sensor processor, and the sensor processor may receive the sensor signals. The sensors may be any type of sensors configured to generate signals representative of temperature. In some examples, the sensors may include infrared cameras that may be coupled to the sensor processor via a USB port.

At 704, the process 700 may include determining via the sensor processor a temperature associated with the at least one computer component based at least in part on the sensor signals. For example, the sensor processor may be configured to convert the sensor signals into temperature data corresponding to the determined temperature of the at least one computer component. In some examples, the sensor processor may be part of, or integrated into, one or more of the sensors. In some examples, the sensor processor may be physically separate from the sensors, and may take the form of, for example, instructions stored in a memory media and executable by a processer. In some examples, the sensor processor may be incorporated into the computer, for example, in the form of instructions stored in the memory of the computer and executable by a processor of the computer.

At 706, the process 700 may include comparing the determined temperature with an expected temperature associated with the at least one computer component. In some examples, this determination may be performed by the sensor processor or by other processors located remotely from the sensor processor. In some examples, the expected temperature may be based on a temperature value determined based at least in part from prior operation of the at least one computer component. In some examples, the expected temperature may be in the form of a temperature profile of temperature versus time and/or temperature versus power input to the component. For example, a computer component may be tested such that its temperature is measured during operation under controlled conditions to generate a temperature profile. For example, the temperature of a component may be monitored during a routine start-up procedure to generate a profile of temperature versus time beginning a start-up and ending once the temperature of the component reaches a steady-state condition, for example, such that the temperature is no longer changing significantly as additional time passes. For example, the temperature associated with the firmware (e.g., BIOS) may be monitored during a booting or re-booting procedure, and if the sensors generate signals indicating that the temperature associated with the firmware is higher than expected (e.g., greater than the expected temperature by an amount greater than the threshold amount), it may be an indication of firmware malfunction or damage, and the monitoring system 114 may initiate a response, such as, for example, issuing a warning to a user interface and/or deactivating the firmware. In such examples, the expected temperature may be based at least in part on temperature profiles obtained from prior booting and re-booting procedures with properly operating firmware. Similarly, the temperature of a component may be monitored during routine operation to generate a profile of temperature versus power input into the component. Such temperatures and/or profiles may correspond to expected temperatures against which the determined temperatures may be compared.

In some examples, the monitoring system 114 and related methods may be used during stress-tests of the computer components. For example, the monitoring system 114 and related methods may be used to monitor the temperatures associated with one or more of the computer components during stress tests to prevent damage to the components from overload and/or overheating. If the temperature of a monitored component approaches a level above which damage may occur, the level of the stress-test may be reduced or the stress-test may be terminated to prevent damage to the component.

In some examples of the method, the interior of the computer chassis may define an area within which at least some of the plurality of computer components are present, and the method may include determining a temperature associated with at least a majority of the area defined by the computer chassis. In some examples, the method may include associating a virtual grid with the area defined by the computer chassis, such that the virtual grid defines virtual grid addresses associated with respective portions of the area corresponding to the virtual grid addresses. For example, the method may include determining temperatures associated with the respective portions of the area, and comparing the determined temperatures may include comparing the determined temperatures of the respective portions of the area with respective expected temperatures associated with respective computer components that correspond to the virtual grid addresses, for example, as described previously herein.

At 708, the process 700 may include initiating a response when the determined temperature differs from the expected temperature by an amount equal to or greater than a threshold amount. In some examples, this determination may be performed by the sensor processor or by other processors located remotely from the sensor processor. In some examples, the threshold amount may be established based on historical operation data and/or empirical information obtained through testing. In some examples, the threshold amount may be established based on technical-based safety factors. In some example, the threshold amount may represent a specific temperature or a temperature range. For example, the threshold amount may be 10 degrees C., such that if the determined temperature is more than 10 degrees C. from the expected temperature, a response is initiated. In some examples, the threshold amount may be determined real-time during operation of the computer components being monitored. For example, the threshold amount may be obtained from a calculation that correlates the threshold amount with one or more parameters associated with operation of the computer. For example, immediately upon start-up of the computer, the threshold amount may be closer to the expected temperature than the threshold amount after the computer has been operating for, for example, several minutes. According to such examples, changes in the threshold amount may permit a greater difference under certain operating conditions. In some examples, the method may include designating via a user interface the threshold amount.

In some examples, initiating a response may include one or more of deactivating the at least one computer component, reducing the level of operation of the at least one computer component, at least one of activating or altering operation of a cooling system associated with the computer chassis, or sending signals indicative of the temperature difference to at least one of a user interface or a receiver located remotely from the computer chassis. In some examples, initiating a response may include sending signals indicative of the temperature difference to at least one of a user interface or a receiver located remotely from the computer chassis, and the method may further include comparing the determined temperature with a determined temperature associated with the temperature inside at least one other computer chassis, for example, as noted previously herein.

In some examples, at 706, comparing the determined temperatures may include comparing the determined temperatures of respective portions of an area with respective expected temperatures associated with respective computer components that correspond to virtual grid addresses. In such examples, initiating a response at step may include initiating a response when one or more of the determined temperatures differs from the respective expected temperatures by respective amounts equal to or greater than respective threshold amounts. For example, the method may include selecting via a user interface at least one of the virtual grid addresses corresponding to respective portions of the area for which the sensor processor will determine the temperature. In such examples, the method may also include comparing the determined temperatures of the selected portions of the area with respective expected temperatures associated with respective computer components that correspond to the respective grid addresses.

In some examples, at least some of the plurality of computer components are associated with a motherboard, and at 702, receiving the sensor signals may include receiving sensor signals representative of a temperature associated with at least a portion of the motherboard. For example, the motherboard may define an area corresponding to a side of the motherboard with which the at least some computer components are associated, and receiving the sensor signals may include receiving sensor signals representative of a temperature associated with at least a majority of the area defined by the motherboard. The method may also include associating a virtual grid with the area defined by the motherboard, such that the virtual grid defines virtual grid addresses associated with respective portions of the motherboard corresponding to the virtual grid addresses. In such examples, at 704, determining the temperature may include determining temperatures associated with the respective portions of the motherboard. At 706, comparing the determined temperatures may include comparing the determined temperatures of the respective portions of the motherboard with respective expected temperatures associated with respective computer components that correspond to the virtual grid addresses. In some examples, at 708, initiating a response may include initiating a response when one or more of the determined temperatures differs from the respective expected temperatures by respective amounts equal to or greater than respective threshold amounts.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A monitoring system for monitoring temperature inside a computer chassis defining an interior configured to contain a plurality of computer components,
   the monitoring system comprising:
   a sensor configured to be mounted inside the computer chassis and generate sensor signals representative of a temperature associated with at least one of the computer components;
   a sensor processor configured to:
   receive the sensor signals;
   determine the temperature associated with the at least one computer component based at least in part on the sensor signals;
   compare the determined temperature with an expected temperature associated with the at least one computer component; and
   initiate a response when the determined temperature differs from the expected temperature by an amount equal to or greater than a threshold amount, the sensor processor configured to permit a designation of the threshold amount via a user interface; and
   a bracket configured to mount the sensor inside the computer chassis such that the sensor is aimed in a first direction.

2. The monitoring system of claim 1, wherein the sensor comprises one of an infrared sensor, a thermal camera, or an infrared camera.

3. The monitoring system of claim 2, wherein the sensor is configured to be aimed in a first direction to facilitate monitoring the temperature associated with the at least one computer component.

4. The monitoring system of claim 3, wherein the sensor is configured to be re-oriented to be aimed in a second direction different than the first direction.

5. The monitoring system of claim 2, wherein the sensor comprises a lens having an adjustable focus.

6. The monitoring system of claim 1, wherein the bracket is configured to facilitate re-orienting of the sensor inside the computer chassis so that the sensor is aimed in a second direction different than the first direction.

7. The monitoring system of claim 1, wherein the interior of the computer chassis defines an area within which at least some of the plurality of computer components are present, and the sensor is configured to be mounted in the computer chassis, such that the sensor signals are representative of the temperature associated with at least a majority of the area defined by the computer chassis.

8. The monitoring system of claim 7, wherein the sensor processor is configured to associate a virtual grid with the area defined by the computer chassis, such that the virtual grid defines virtual grid addresses associated with respective portions of the area defined by the computer chassis.

9. The monitoring system of claim 8, wherein the sensor processor is configured to:

determine temperatures associated with the respective portions of the area;

compare the determined temperatures of the respective portions of the area with respective expected temperatures associated with respective computer components that correspond to the virtual grid addresses; and initiate a response when one or more of the determined temperatures differs from the respective expected temperatures by respective amounts equal to or greater than respective threshold amounts.

10. The monitoring system of claim 9, wherein the sensor processor is further configured to:

receive a user selection of at least one of the virtual grid addresses corresponding to respective portions of the area for which the sensor processor will determine the temperature; and compare the determined temperatures of the selected portions of the area with respective expected temperatures associated with respective computer components that correspond to the respective virtual grid addresses.

11. The monitoring system of claim 1, wherein initiating a response comprises at least one of deactivating the at least one computer component, reducing the level of operation of the at least one computer component, at least one of activating or altering operation of a cooling system associated with the computer chassis, or sending signals indicative of the temperature difference to at least one of a user interface or a receiver located remotely from the computer chassis.

12. The monitoring system of claim 1, wherein the at least one computer component comprises at least one of a processor, a central processing unit, a chipset, memory, memory chips containing firmware, a clock generator, an expansion card, a graphics card, a super input/output chip, or a disc drive.

13. The monitoring system of claim 1, wherein the expected temperature associated with the at least one computer component comprises a temperature value determined based at least in part from prior operation of the at least one computer component.

* * * * *